United States Patent [19]
de Bazelaire

[11] Patent Number: 5,991,237
[45] Date of Patent: Nov. 23, 1999

[54] METHOD FOR THE DETERMINATION OF MIGRATION VELOCITIES IN SEISMIC PROCESSING

[75] Inventor: Eric de Bazelaire, Lescar, France

[73] Assignee: Elf Exploration Production, France

[21] Appl. No.: 08/981,207

[22] PCT Filed: Apr. 9, 1997

[86] PCT No.: PCT/FR97/00629

§ 371 Date: Mar. 17, 1998

§ 102(e) Date: Mar. 17, 1998

[87] PCT Pub. No.: WO97/40406

PCT Pub. Date: Oct. 30, 1997

[30] Foreign Application Priority Data

Apr. 22, 1996 [FR] France ................................. 96 05028

[51] Int. Cl.[6] ............................................. G01U 1/36
[52] U.S. Cl. ............................... 367/50; 367/52; 367/53; 367/59
[58] Field of Search .................................. 367/51, 54, 50, 367/52, 59, 53; 702/18

[56] References Cited

U.S. PATENT DOCUMENTS

| | | | |
|---|---|---|---|
| 4,888,742 | 12/1989 | Beasley | ........................................ 367/54 |
| 4,964,089 | 10/1990 | Wang et al. . | |
| 4,992,996 | 2/1991 | Wang et al. . | |
| 5,128,899 | 7/1992 | Boyd et al. | ................................ 367/51 |

FOREIGN PATENT DOCUMENTS 0442719   8/1991   European Pat. Off. .

OTHER PUBLICATIONS

G. Chavent, et al., "Determination of Background Velocities by Multiple Migration Fitting", Geophysics, vol. 60, No. 2, Mar. 1995–Apr. 1995, pp. 476–490.

P.D. Thore, et al., "The Three–Parameter Equation: An Efficient Tool To Enhance the Stack", Geophysics, vol. 59, No. 2, Feb. 1994, pp. 297–308.

*Primary Examiner*—Christine K. Oda
*Assistant Examiner*—Anthony Jolly
*Attorney, Agent, or Firm*—Ostrolenk, Faber, Gerb & Soffen, LLP

[57] ABSTRACT

A method for the determination of migration velocities in seismic processing in which a blasting point S is associated with receivers ($R_1$ to $R_n$) which are separated by offsets such that in a given speed range, a first set of traces derived from the blasting point and registered on the receivers, and a second set of traces in constant and colinear offset to the first set are migrated. Two migrated images of the part of the site corresponding to the two sets of traces are obtained. The two images are correlated by means of a spatial two-dimensional correlation, the result thereof determining the deviation between the migration used and the investigated velocity. The result is particularly useful in the seismic prospection of a site.

14 Claims, 12 Drawing Sheets

METHOD FOR THE DETERMINATION OF MIGRATION VELOCITIES IN SEISMIC PROCESSING

The present invention relates to a method for determining migration velocities in seismic processing, as well as the accuracy on the said velocities.

The acquisition of knowledge regarding a medium employs interactive interpretation systems. Interactive interpretation is nowadays no longer limited to a two-dimensional (2D) representation whether it is performed on a physical medium such as paper or, displayed on a screen. Three-dimensional (3D) data display techniques have become widely generalized and lead to the production of a three-dimensional model of a part of the medium to be studied. Among the methods used to obtain the best possible model, depth migrations or time migrations are used, that is to say that a seismic event on a seismic section is reproduced in the model according to the depth at which it has been identified or according to the time after which it has been located.

One of the most difficult problems to solve in seismology for depth migration is that of obtaining a migration velocity field which is as representative as possible or as close as possible to that of the subsurface strata, since the propagation velocities of the acoustic waves can vary not only from one layer or stratum to another but also within a given stratum.

It is furthermore necessary to be able to estimate the uncertainty on the velocity values calculated or found. This is because it is using these velocity uncertainties, associated with the uncertainties on the arrival times, that a development geophysicist, for example, will be able to calculate the uncertainties on the volumes of rocks impregnated with hydrocarbons.

New techniques are used. They involve, for example, a method in which use is made of what are referred to as "image-gathers" or iso-X curves in order to converge to the correct velocity model. A method of this type does not make it possible to measure the uncertainty on the velocities which are obtained, because there is no concrete analytical criterion for measuring these uncertainties.

Another method consists of estimating an uncertainty which is conditional on the velocities assigned to a predefined model of the process. Although a process of this type gives good results in some applications, for example the ones described in the articles which have appeared in the publication "the Leading Edge" of October 1995, Vol. 14, No. 10, it is nevertheless still true that it does not make it possible to separate sufficiently the errors which are due to imperfections on the morphology of the model of the subsurface, from those which are due to an imperfection on the values of the velocities.

For the methods summarized above, the difficulty originates from the fact that, when changing the value of the local velocity of a zone when the interfaces or horizons are not plane and horizontal, the rays describing the propagation of the acoustic waves in this zone are displaced laterally at the same time as their propagation time changes, whereas the spatial measurement frame remains fixed. The result of this is that the law describing the deformation of the iso-X curves or image gathers as a function of a variation in the velocities is non-linear and non-reversible.

The image-gathers correspond to collections of traces which are sorted for a given X and originate from a constant-offset migration. These traces are generally ordered by increasing offset.

The iso-X curves originate from a shotpoint migration.

The object of the present invention is to propose a new method which overcomes the drawbacks connected with the methods of the prior art and which makes it possible to take account of the variations in the velocities of the environment.

One object of the method according to the invention is to obtain a velocity field which is very close to that of the environment.

Another object of the method according to the invention is to measure, or at the least acquire better knowledge of the uncertainties on the values of the velocities which are calculated.

To achieve these objects, the present invention provides a method for determining a migration velocity field in a medium in which a first set of traces is provided which originate from a shotpoint and are recorded on receivers separated from each other by offsets, the traces corresponding to a part of the medium. A second set of traces is provided which is colinear with the first set and which is comprised of traces with constant offset. In a given velocity field the sets of traces are migrated to obtain two migrated images of the part of the medium. The two migrated images are correlated by means of a two-dimensional spatial correlation whose result determines the difference between the given migration velocity field and the migration velocity field of the medium.

The term colinearity of the sets of traces is intended to mean a surface which contains all the prestack and poststack rays, that is to say the surface containing the prestack rays coincides with the surface containing the poststack rays.

According to another characteristic of the invention, the migration is a depth migration.

According to another characteristic of the invention, the migration is a time migration.

According to another characteristic of the invention, the correlation is performed using a surface coherence treatment.

According to another characteristic of the invention, the correlation is performed using a line coherence treatment.

According to another characteristic of the invention, the line coherence treatment is preceded by a surface coherence process.

According to another characteristic of the invention, the surface coherence treatment in which there are the steps of:

a) determining, for a first of the two migrated images, at least a first window whose dimensions are such that it comprises at least one of the seismic events picked on the first image;

b) defining, in the first window, a single amplitude ($A_{ij}$) which represents the mean of the amplitudes of the pixels in the first image which are included in the first window;

c) locating the first window by the coordinates (x, z) of its center;

d) moving the first window over the entire surface of the depth-migrated section;

e) performing steps a) to d) for the second of the two migrated images, with at least a second window in which a single amplitude ($B_{ij}$) is defined which represents the mean of the amplitudes of the pixels of the second image which are included in the said second window; and f) defining a correlation coefficient ($\Gamma$) by coupling at least two windows, one of which is associated with one of the two migrated images and the other of which is associated with the second of the migrated images, the coupled windows having the same spatial position.

According to another characteristic of the invention, lines of equal value of the correlation coefficient ($\Gamma$), also referred to as isovalue lines are optionally calculated and represented, the maximum value ($\Gamma_M$) of the correlation coefficient ($\Gamma$) is determined, the coordinates (x', z') of the point of maximum correlation ($\Gamma_M$) are plotted, and, the half isovalue ($\Gamma_M/2$) defined as half the maximum value ($\Gamma_M$) of the correlation coefficient are calculated.

According to another characteristic of the invention, the displacement vectors representing the offsets between the two migrated images are measured in which the displacement vectors are measured over the entire surface which is common to the two migrated images and lies within each half isovalue ($\Gamma_M/2$).

According to another characteristic of the invention, the lateral gradients of the migration velocity field used are calculated, as well as the sign of the error on the migration velocity close to the point of maximum correlation ($\Gamma_M$), then the displacement vectors lying between the point and the correlation curve representing the half isovalue ($\Gamma_M/2$) are summed separately to the left and to the right of the point so as to obtain a stack vector on each side of the point of maximum correlation, the direction or sign of which determines the slow or fast nature of the local migration velocity with respect to the optimum velocity, then the signs of the stack vectors are compared in order to determine the existence or absence of a lateral component of the migration velocity.

According to another characteristic of the invention, two depth-migrated images are produced, one being representative of depth-migrated seismic events and the other being representative of the depth-migrated shotpoint, an isolated event is picked on each of the two migrated images, and the distance between the two picked events is calculated so as to calculate the length of the local displacement vector.

According to another characteristic of the invention, by means of a ray-tracing technique, the two limiting rays corresponding to the zero-offset (SHS) and maximum-offset ($SBR_n$) rays are calculated.

According to another characteristic of the invention, use is made of a plurality of shotpoints which are migrated with staggering in different migration planes.

According to another characteristic of the invention, the two sets of traces are migrated by means of the same algorithm.

One advantage of the present invention is the ability to compare two separate migrated images. When the two migrated images are identical in the spatial field, the correlation is a maximum and the deduction made from this is that the velocity field used is accurate.

When the velocity field used is too slow or too fast compared to the real velocity field, the correlation decreases over the peripheral parts of the migration field, while keeping a maximum value at the location where the prestack and poststack migrated rays are the same.

Furthermore, the displacement vector of the correlation, indicating the direction in which one migrated image is deformed compared to the other, changes direction and therefore sign when the error on the velocity also changes sign.

By virtue of these two-dimensional correlation functions, a means is obtained, in the spatial field common to the two migrated images, for measuring the most probable velocity, as well as an estimate of the uncertainty on the velocity, estimated by measuring the full-width at half maximum of the function giving the standard deviation of the correlation as a function of the velocity.

Other advantages and characteristics will emerge more clearly on reading the description of the method according to the invention, as well as the appended drawings, in which.

Figure 1:
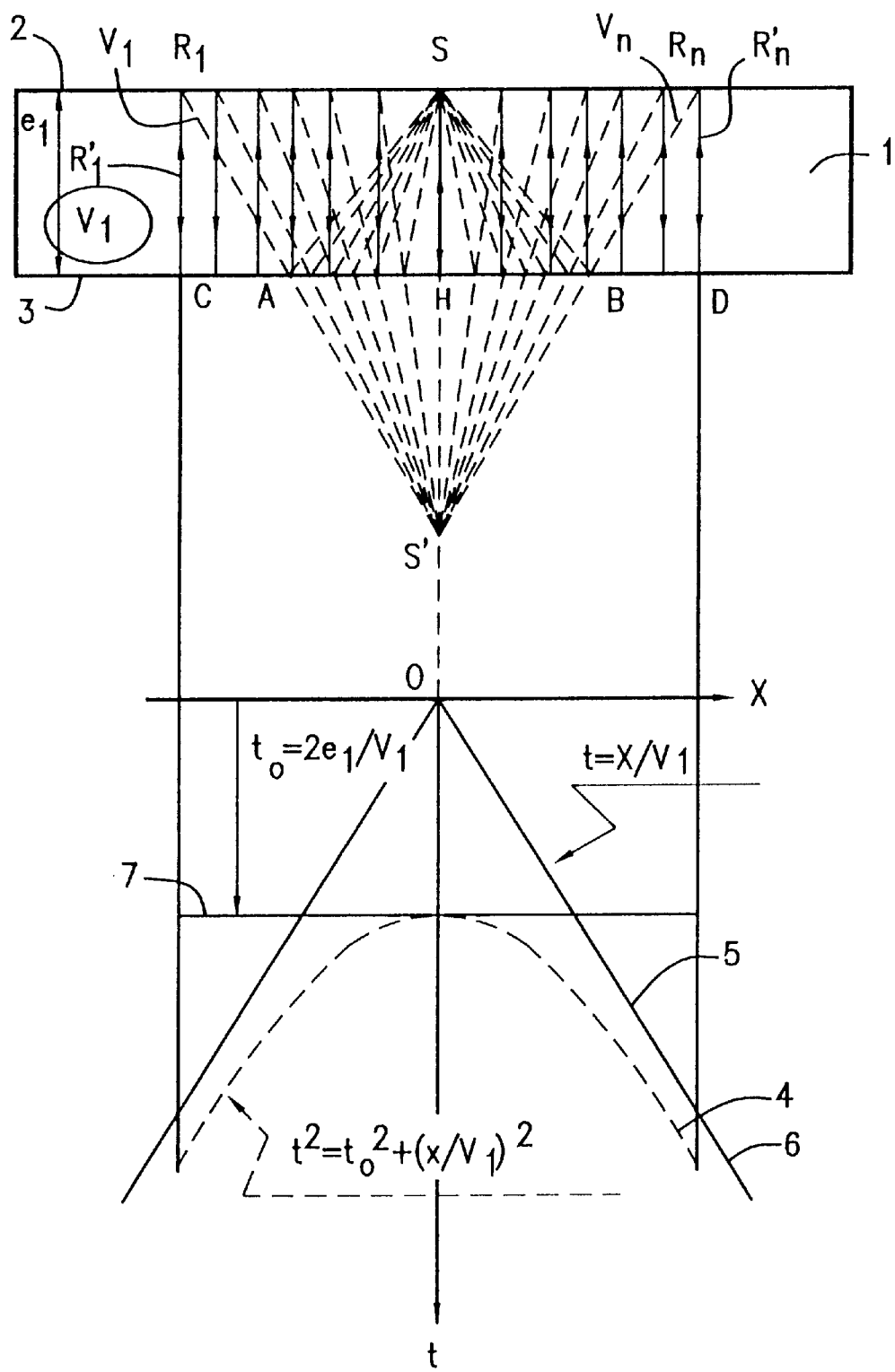
FIG. 1 is a schematic representation of the prestack and poststack rays in a stratum of velocity $V_1$, propagating in a stratum, as well as the time images of the said rays.

A simple, theoretically calculable example of the method according to the invention is given with reference to FIG. 1, by considering a subsurface stratum 1 delimited by the surface 2 and a plane and horizontal horizon 3. A shotpoint S and receivers $R_1$ to $R_n$ are arranged on both sides of the shotpoint S with constant or non-constant offsets. As can be seen in FIG. 1, the shotpoint S lies at the center of the model and emits waves along rays which, after reflection from the horizon or reflector 3, are received and recorded on the receivers $R_1$ to $R_n$. The part of the reflector which is illuminated by the shotpoint S is the segment AB. It is assumed that the waves propagate in the stratum with a constant velocity $V_1$ and that the zero-offset ray SHS has also been recorded.

The rays $r_1$ to $r_n$ which originate from the shotpoint S and reach the receivers $R_1$ to $R_n$ after reflection from the reflector 3 constitute a first set of unstacked traces, while the rays corresponding to the poststack traces consist of the rays $R'_1$ to $R'_n$ which originate from each of the receivers $R_1$ to $R_n$ and impinge perpendicularly on the reflector 3. In this geometrical case, that part CD of the reflector which is illuminated by the rays $R'_1$ to $R'_n$ is greater than the part AB.

FIG. 1 also represents the time images obtained from the rays $r_1$ to $r_n$ and $R'_1$ to $R'_n$ which are described above.

The prestack image of the shotpoint S is a hyperbola 4 which, in the coordinates system Xot, has the equation:

$$t^2(X) = t_o^2 + X^2/V_1^2 \tag{1}$$

in which:

$t_o = 2e_1/V_1$ where $e_1$ is the distance separating the surface 2 from the reflector 3, and X is the distance $Sr_i$.

The hyperbola 4 has a center of symmetry coinciding with the origin O of the coordinates, and an apex lying at the time distance $t_o$ from O the asymptotes 5 and 6 of the said hyperbola 4 have the equation $t=\pm X/V_1$.

The poststack time image of the part CD corresponding to the section part $R_1R_n$ is a horizontal line segment 7 which, in the same coordinates system Xot, has the equation:

$$t(X)=t_o \text{ for all } X \quad (2)$$

The two sets of rays represented in the upper part of FIG. 1 are depth-migrated in a velocity field defined by a semi-infinite medium below the surface 2 and having velocity $V_2<V_1$. This is what is represented in the upper part of FIG. 2, where the two depth migrations with velocities $V_1$ and $V_2$ are juxtaposed. The poststack migration of the traces for the velocity $V_2$ is manifested by a horizontal depth horizon 8, and the prestack migration of the shotpoint S (rays which originate from the source S and are recorded on the receivers) consists of a circle arc 9 which is tangent to the line 8 and whose radius can be calculated.

Figure 2:
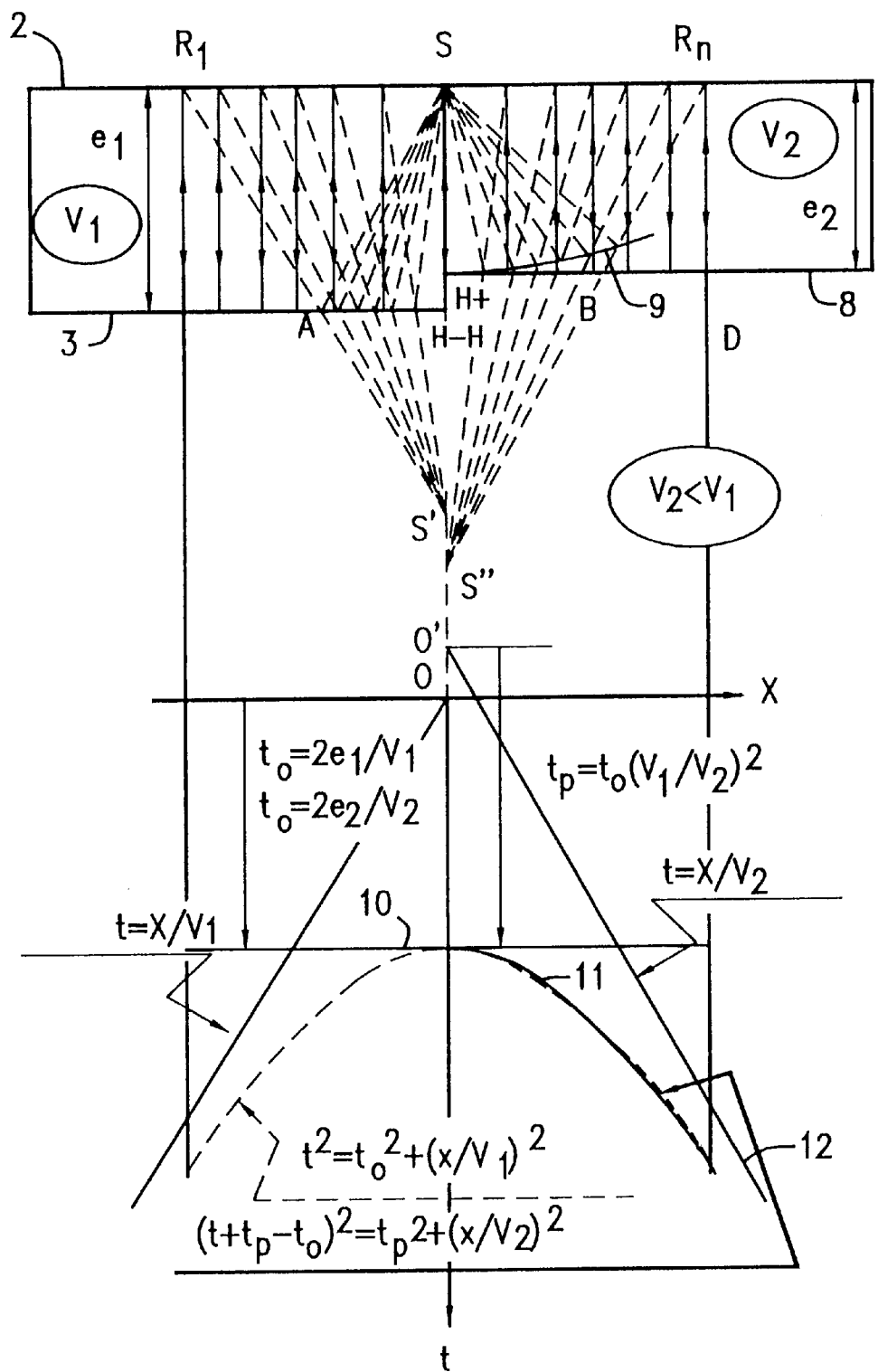
FIG. 2 is similar to FIG. 1, but in a velocity field defined by a semi-infinite medium comprising different velocities $V_1$ and $V_2$.

The time images of these migrations are represented in the lower part of FIG. 2, the poststack time image being, obviously, a horizontal line 10 lying at a depth $e_2$ defined by the equation $$e_2=V_2t_o=V_2/V_1 e_1 \quad (3)$$

with $t_o=2e_1/V_1$; the prestack image is a hyperbola 11 with an asymptote 12 of slope $X/V_2$ since migration is carried out at velocity $V_2$. The equation of the hyperbola is of the PSCAN type defined in some publications by Eric de BAZELAIRE, and it has the form:

$$(t+t_p-t_o)^2=t_p^2+X^2/V_2^2 \quad (4)$$

In paraxial approximation, equations (1) and (4) are expanded in powers of X, and when the first two terms in the two expansions are identified, it is found that:

$$t_p=t_oV_1^2/V_2^2$$

It is seen that $t_p$ is greater than $t_o$. The PSCAN hyperbola thus defined represents the point S" which is the image of the point S by reflection from the mirror which is sought. It is at the depth P defined by:

$$P=V_2t_o=t_oV_1^2/V_2$$

The mirror to be reconstructed is the one among those which gives from S the image S" which has its pole at the distance $e_2=V_2t_o$. It is therefore defined by the following conjugation formula:

$$(1/-V_2)(1/HS''-1/R)=(1/+V_2)(1/HS-1/R) \quad (5)$$

This is because, for a mirror, the return velocity has the value of the forward velocity with the sign changed. By replacing HS and HS" in (5) by their value, the value of the radius of curvature of the migrated interface is found. It is defined by equation (6):

$$R=e_2(2V_1^2-V_2^2)/2(V_2^2-V_1^2) \quad (6)$$

It can be seen that R is negative and has a modulus greater than $e_2$. This gives the image in FIG. 2, with a divergent meniscus shape 9 having upwards concavity.

This result can also be interpreted by stating that, since the ray $SBR_n$ is longer than the ray $R_nDR_n$, the difference or discrepancy in length is due to the migration with a velocity which is too small, and the deduction from this is that B is above D. Studying formula (6) shows that if migration is carried out at the correct velocity $V_1=V_2$, the radius R is infinite, which means that the two migrated images are superposed.

Figure 3:
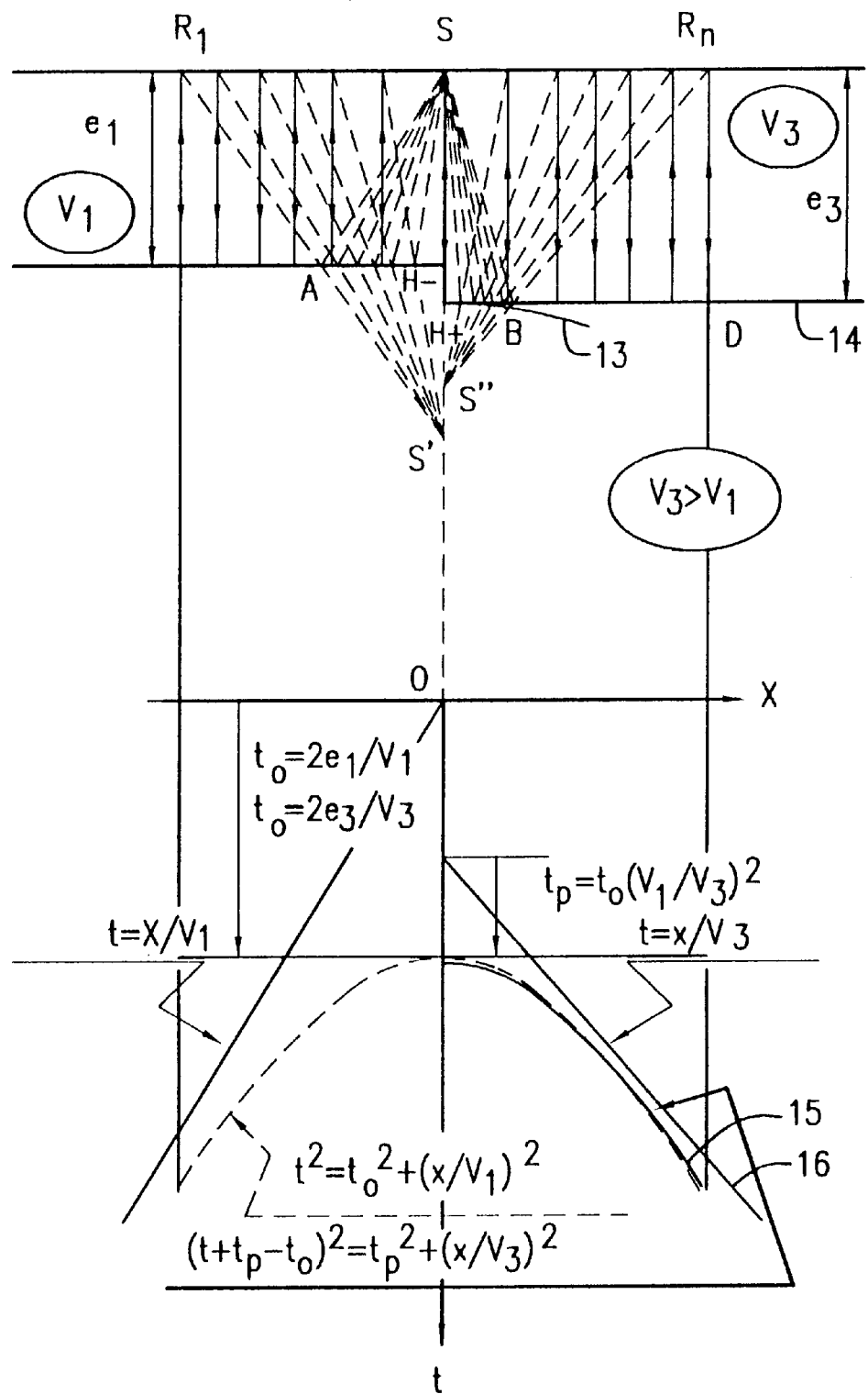
FIG. 3 is similar to FIG. 2, with velocities $V_3$ and $V_1$ different from those used for the said FIG. 2.

When migration is carried out in a medium with a velocity $V_3$ which is greater than $V_1$ (FIG. 3), the radius R becomes positive for velocity values such that $$V_1<V_3<\sqrt{2}.V_1$$

In this case, the prestack migrated image of the first set of traces consists of a divergent meniscus 13 which has downwards concavity and is tangent to the line 14 representing the poststack migrated image of the second set of traces. The time images of these depth migrations are represented in part of FIG. 3.

The equation of the hyperbola 15 representing the prestack depth migration has the equation $$(t+t_p-t_o)^2=t_p^2+(X/V_3)^2$$

and the asymptote 16 has the slope $t=X/V_3$.

The image of S is in this case S''' and the point B lies below D.

Figure 4:
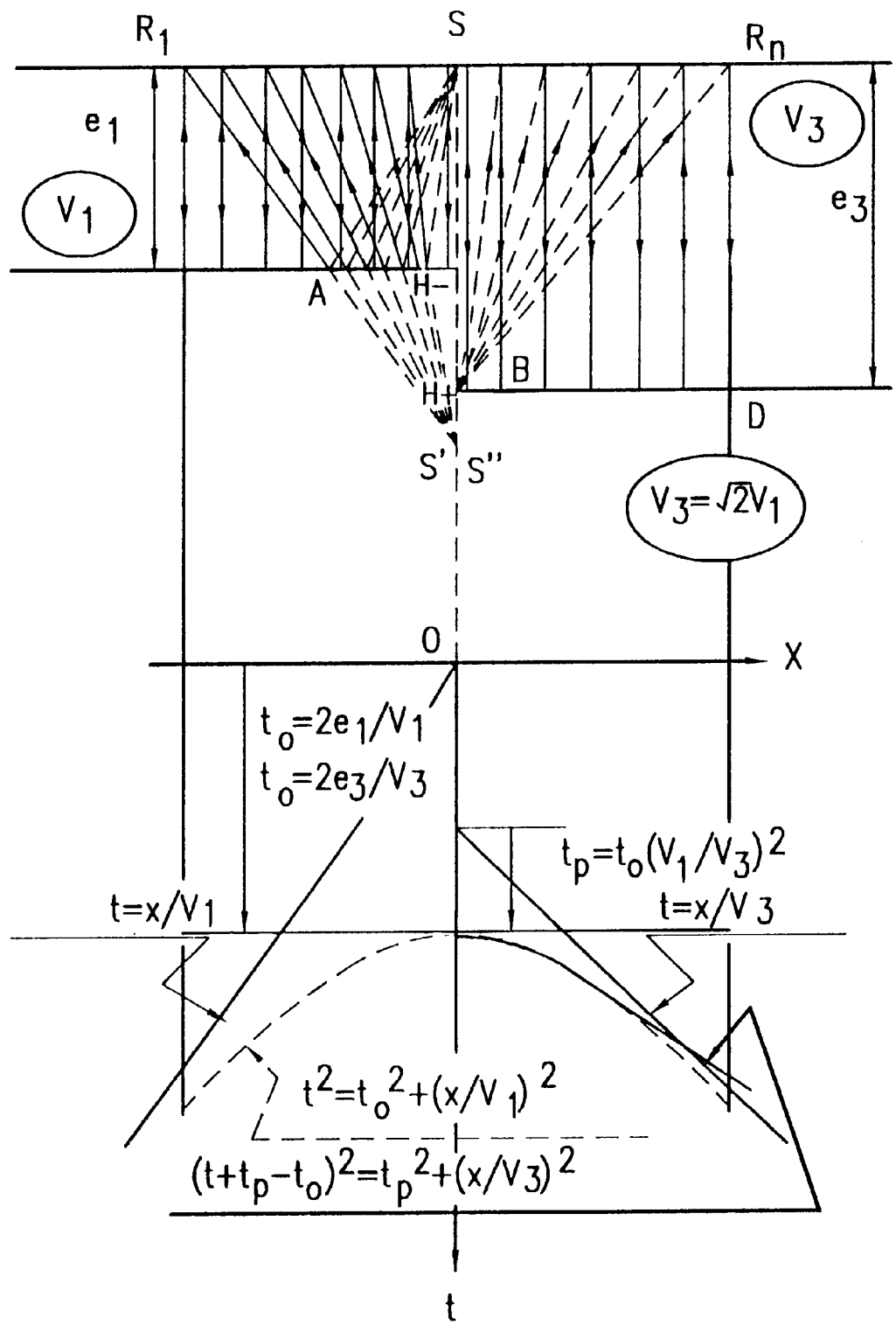
FIG. 4 is similar to FIG. 3, with a predetermined value of one velocity relative to the other ($V_3 = \sqrt{2}.V_1$)
Figure 5:
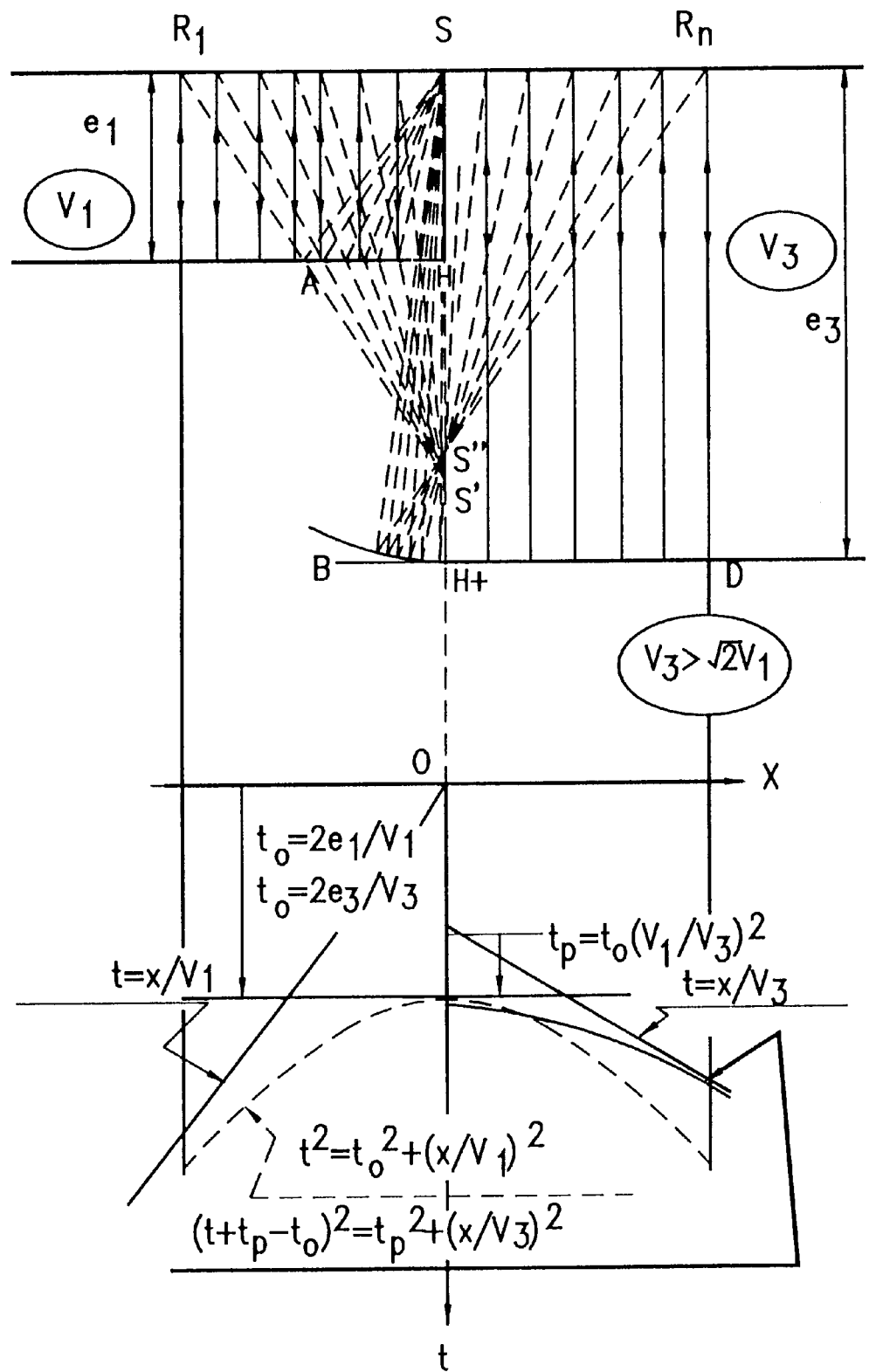
FIG. 5 is similar to FIG. 4, with a velocity $V_3 > \sqrt{2}.V_1$.
Figure 6:
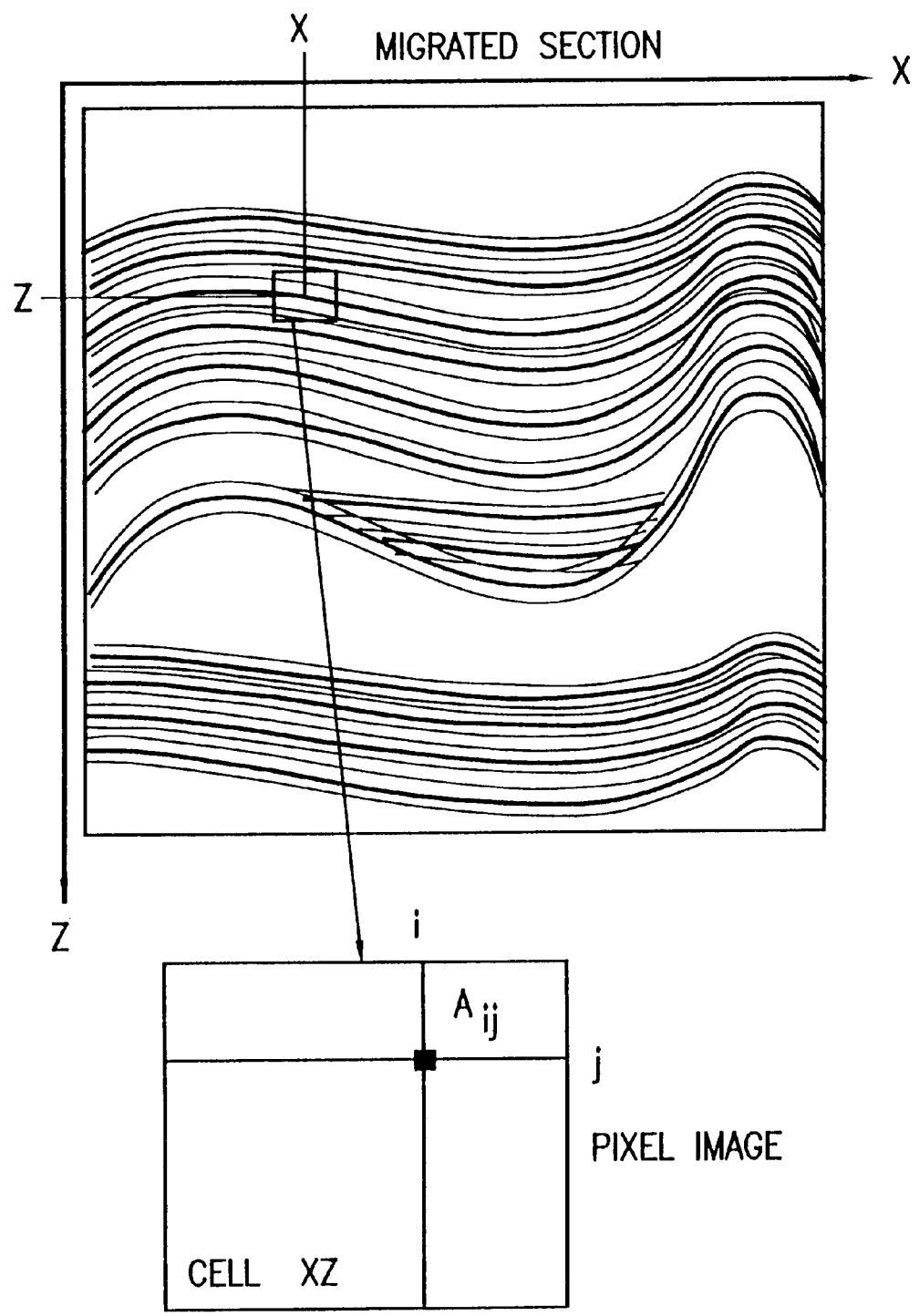
FIG. 6 is a schematic representation of a depth-migrated section of seismic events.
Figure 7:
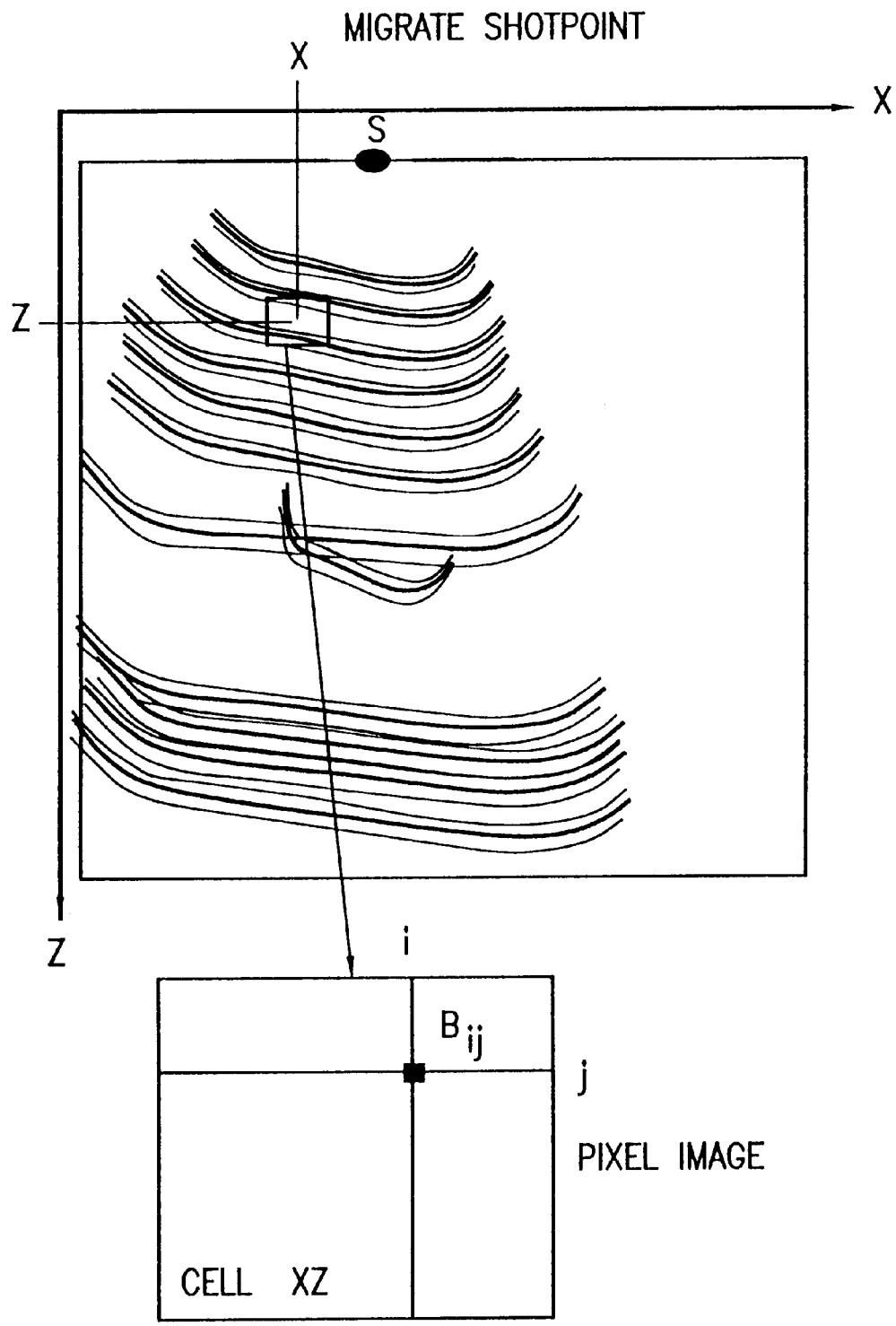
FIG. 7 is a schematic representation of a migration of the rays originated from the shotpoint in the same velocity field which is used for the representation in FIG. 6.
Figure 8:
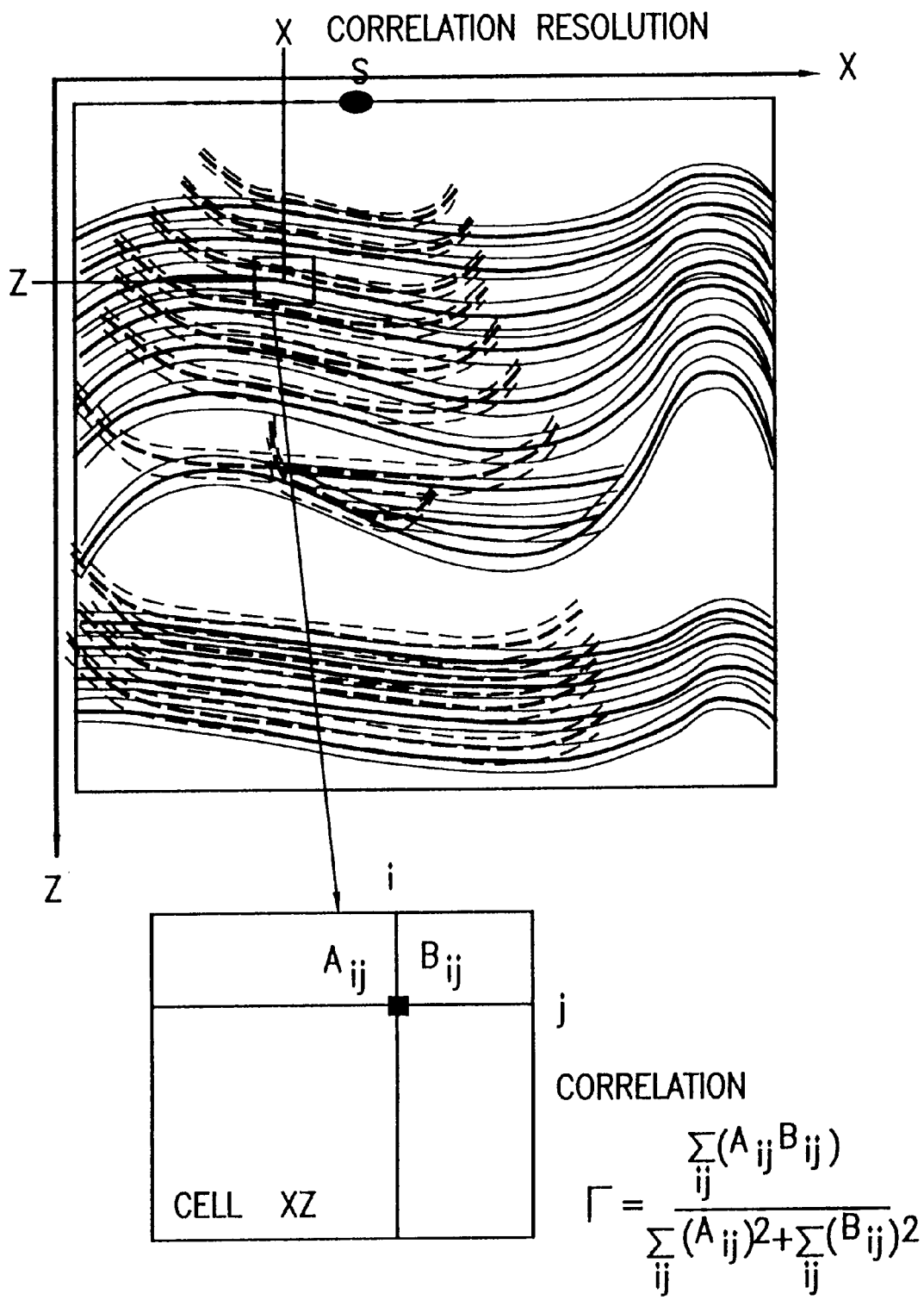
FIG. 8 is a schematic representation of the correlation of the migrated images of FIGS. 6 and 7.
Figure 9:
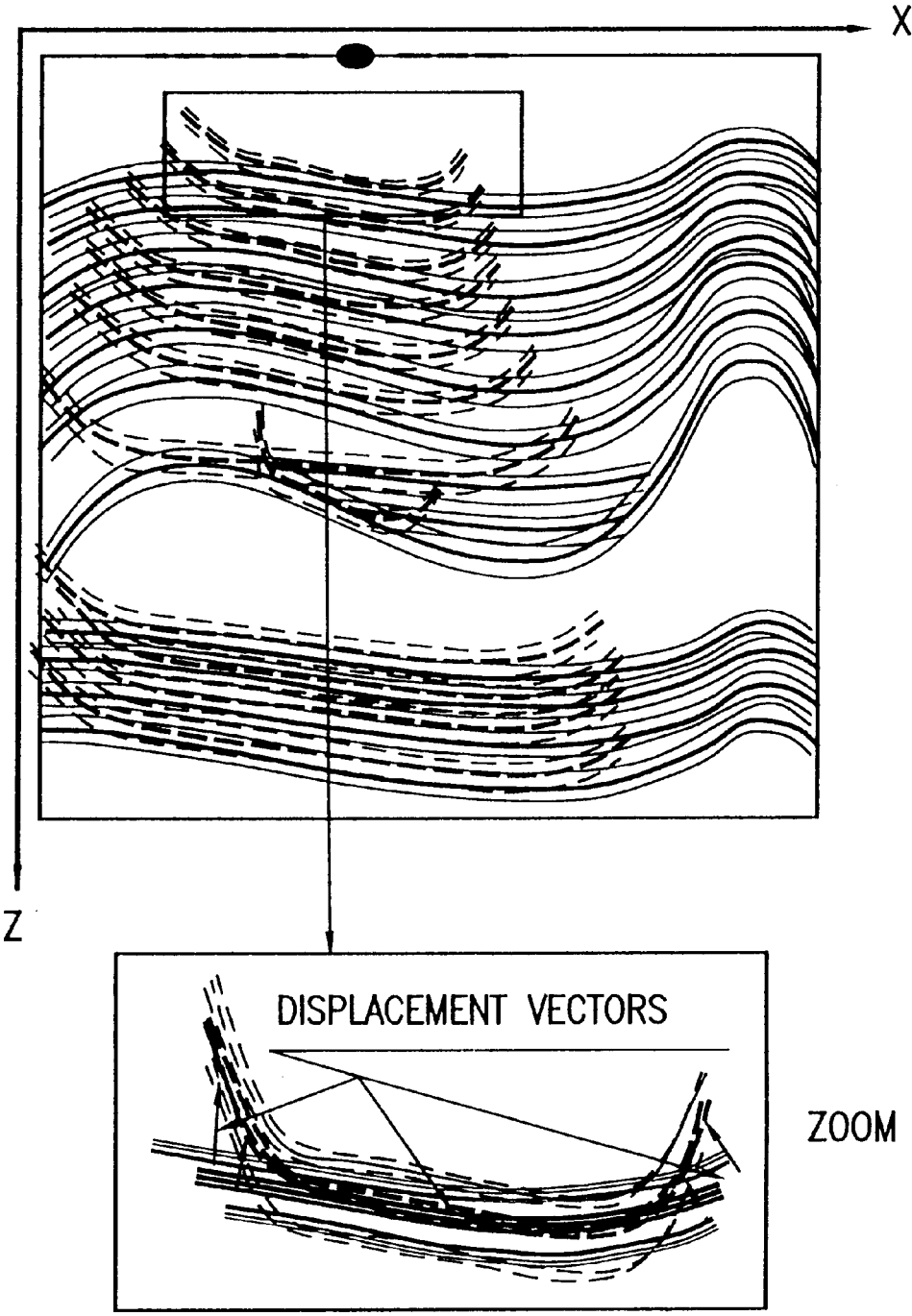
FIG. 9 is a schematic representation showing the displacement vectors of the correlation in FIG. 8.

In the particular case (FIG. 4) in which $V_3=\sqrt{2}.V_1$, the prestack migration of the shotpoint S gives a defracting point with radius of curvature R=0. Finally, for velocity values such that $V_3>\sqrt{2}.V_2$, there is a change in concavity of the meniscus, with radii of curvature having a modulus less than the thickness $e_2$.

Referring again to FIG. 2, it can be seen that, at the point H lying vertically in line with S, the two images are superposed and they always will be regardless of the velocity field used and regardless of the geometry of the subsurface. This is because the rays illuminating the point H for the two migrations are the same. They are the radii normal to the mirror at the point H. The amplitude of the correlation at the point H therefore passes through an absolute maximum. The spatial separation between the two migrated horizons passes through the value zero at this point. In the case of FIG. 2, and when moving away from the point H to the left (H−) or to the right (H+) while following the depth horizon of the poststack image, it can be seen that the depth horizon of the prestack image moves away tangentially upwards on both sides.

To measure the discrepancies between the two images, use is made of the surface correlation process which takes into account the said images by their pixel-based description.

In the case of real data, the seismic events are distributed outside the blind zones over the entire surface of the depth section. FIG. (6) shows a depth-migrated section provided with this type of distribution. The thick plots represent the positive central lobes of the migrated shotpoint signal. The first side lobes have been represented in thin plots. Each continuous line (thick plot) represents one seismic event. Over an elementary window represented by a black square, the size of which is such that there is at least one seismic event over its surface, a grid of elementary squares is defined, these being referred to as pixels, and a single amplitude $A_{ij}$ is defined in each of them. This amplitude is the mean of all the samples of the pixel. The size of the elementary window may be kept fixed. This elementary window, called a cells is located by the coordinates XZ of its center. It will subsequently be moved over the entire surface of the depth section.

FIG. (7) represents the depth migration of the shotpoint S in the same velocity field as in FIG. (6). This depth migration contains edge effects at the ends of each horizon. As for the previous image, another elementary window is defined on this section, in which a single amplitude $B_{ij}$ is defined, representing the mean of the amplitudes of the pixels of the second image which are included in the said other window. It is then possible to define a correlation coefficient $\Gamma_{xz}$ by coupling two elementary windows or cells, each belonging to one image and having the same center, and while calculating $\Gamma$ using the formula:

$$\Gamma = \frac{\sum (A_{ij} B_{ij})}{\sum (A_{ij})^2 + \sum (B_{ij})^2} \quad (7)$$

in which the summations ($\Sigma$) are extended to all the pixels of the two coupled windows. FIG. (8) illustrates the coupling of the two elementary windows having the same position, and the calculation of the correlation $\Gamma$ for this coupling. The two previous depth sections have been superposed, which makes it possible to see the parts of each section which are similar and those which diverge.

The second step consists of calculating and plotting the lines of equal value of the correlation $\Gamma$, which are referred to as isovalues. These lines lie one inside the other, as is shown in FIG. (10). The maximum value of $\Gamma$, referred to as $\Gamma_M$, lies within these lines, and its coordinates x and z are defined. The isovalue defined by half this maximum value, referred to as isovalue $\Gamma_M/2$, is calculated. Each horizon of the window has a $\Gamma_M$ position and value, as well as a surface defined by its isovalue $\Gamma_M/2$.

The third step consists of measuring the shifts between the two images in order to deduce the displacement vectors therefrom. They are measured over the entire surface which is common to the two migrated images and lies within each isovalues $\Gamma_M/2$.

Figure 10:
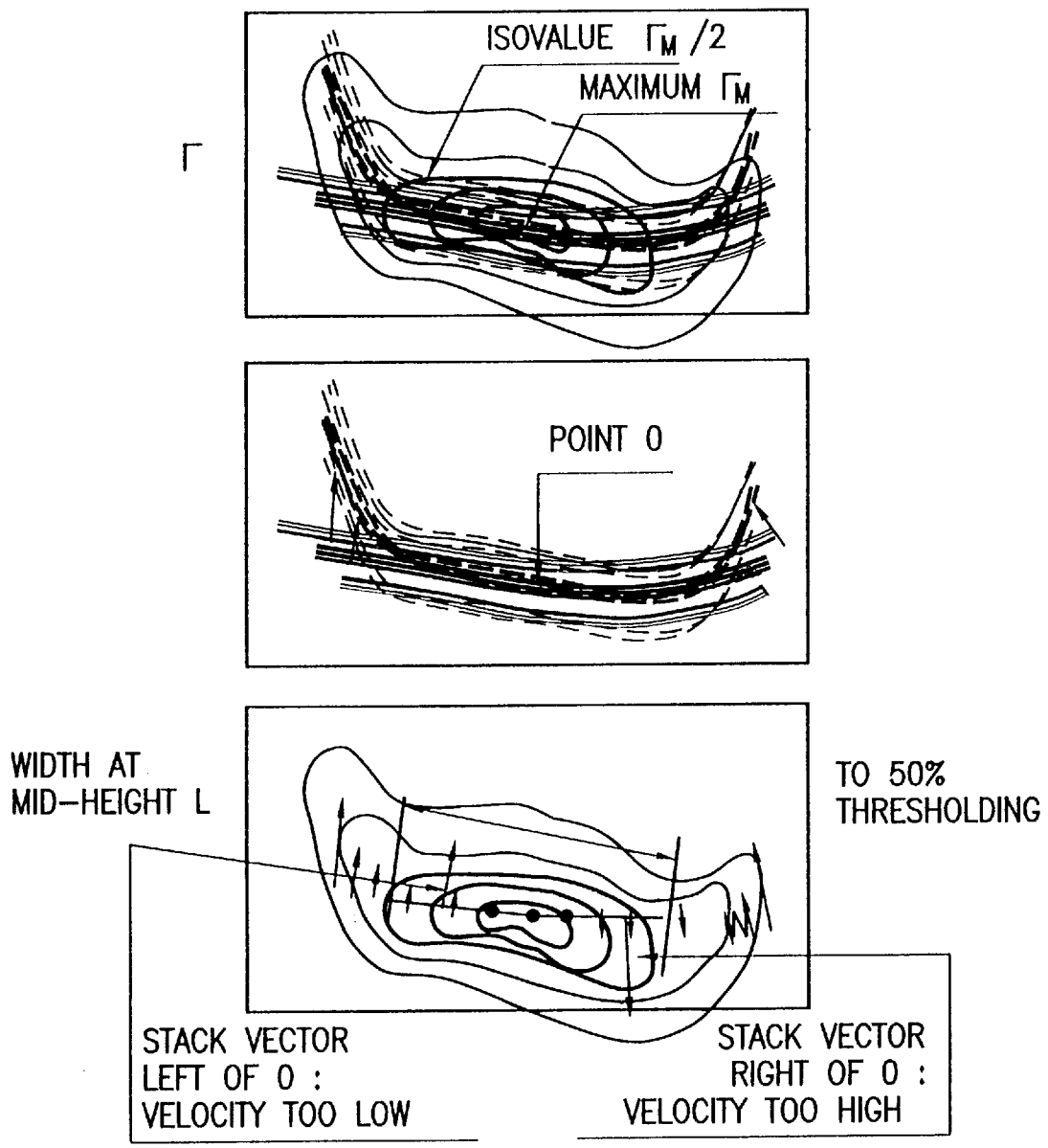
FIG. 10 is a schematic representation of the lines of equal value of the correlation.

The starting point is a pair of cells with the same position, such as the ones in FIG. (8). One of the two cells is shifted relative to the other in a defined direction, for example a horizontal direction, and the same cell is then shifted in the orthogonal direction by the amount required for the correlation $\Gamma$ to pass through a local maximum. An elementary displacement vector is thus defined, such as the ones represented in FIG. (9), and they are drawn as arrows. The operation is repeated for all the locations needed for proper definition of the two stack vectors to the left and to the right of the zero-displacement point defined both by the identical rays common to the two migrated images and to the points of maximum correlation $\Gamma_M$ (FIG. 10).

The lower part of FIG. (9) represents an enlargement of a common part of the two depth sections in FIGS. (6) and (7). The displacement vectors have been represented for each desired position. The same enlarged part is represented in FIG. (10). At the top, the correlation isovalues of the local horizon have been plotted. At the center, the displacement vectors have been reproduced and the zero-displacement point 0 has been located, which coincides with the point of maximum correlation $\Gamma_m$. The bottom part of FIG. (10) represents the surface resulting from the 50% thresholding by removing the surfaces containing isovalues of amplitude less than $\Gamma_M/2$. Along the horizons, the isovalue $\Gamma_M/2$ has a length referred to as the full-width at half maximum L.

It is this full-width at half maximum L which is characteristic of the error made on the migration velocity. Specifically, it passes through a maximum when the migration velocity is accurate, and it decreases when the migration velocity moves above or below the correct value. A measurement of the two velocity values which decreases this full-width at half maximum L by 10% gives an estimate, not biased by the geometry, of the error on the migration velocity.

In order to estimate the lateral migration-velocity gradients and the sign of the error on the migration velocity located in the vicinity of the point 0, the vector sum is taken, separately to the left and to the right of this point 0, of the displacement vectors lying between the said point 0 and the correlation curve representing the isovalue $\Gamma_M/2$. For each side, this vector stack gives a resultant vector referred to as the stack vector, If the bundles of rays originating form the shotpoint S and the rays normal to the mirrors have no buried foci, then when the stack vector is oriented in the direction of the normal ray, as the one on the left in FIG. (10), the local migration velocity is too small (or too slow). If the stack vector is oriented in the opposite sense to the direction of the normal ray, as the one on the right in FIG. (10), the local migration velocity is too high (or too fast). The sign rule reverses each time one of the bundles of rays passes through a reel focus. An even number of foci does not change the above rule. When the two stack vectors have opposite signs, this means that the velocity contains a lateral component, referred to as a lateral velocity gradient, and the velocity used for the migration is accurate at the point 0, that is to say along the normal ray.

The present invention makes it possible to estimate this lateral velocity gradient in the following way:

If $V_o$ is the migration velocity at the point 0, the velocity gradient can be expressed by the formula:

$$V = V_0 + kx$$

where k is a positive or negative constant to be determined, x is the direction perpendicular to the normal ray in the incidence plane.

A value of k is fixed a priori, which defines a migration velocity field in the stratum in question, and a migration is carried out according to the invention in this velocity field. The migrations are repeated until the stack vectors to the left and to the right of the point 0 cancel out. A value of k which is too high changes the sign of the two stack vectors.

The value of k is therefore determined, as well as the corresponding velocity field in the analysis zone.

The method described above is iterative for each successive stratum starting from the first stratum which is crossed.

It is also possible to use the line coherence process with or independently of the surface coherence process.

The line coherence measurement process is incorporated in the above process when very high accuracy is desired for the estimate of the migration velocity. To some extent, the line coherence process fulfils the role delegated to a vernier in length measurements. Specifically, after having reached convergence with the surface coherence method, the process of implicitly measuring the displacement vectors which is described above is replaced by a more sensitive explicit process which consists in identifying an isolated event on the two depth-migrated sections in FIGS. (6) and (7) and in calculating the distance between the identified events using known programs for calculating residual static corrections. These programs calculate the cross-correlations between two traces corresponding to each pair of two lines of pixels of the elementary cells, perpendicularly to the identified events, then they identify the first side peak of each cross-correlation function, the position of which describes the length of the local displacement vector. The direction of this vector is defined by the chronology of the two events which are identified.

In order to refine the local measurement further, it is possible to adjust the limit of the summation zone, to the left and to the right of 0, for the displacement vectors so as to increase the accuracy of the measurement of the stack vectors. To do this, on the basis of the migration velocity field used and the two identifications of the events, prestack and poststack, a ray-tracing program is used to calculate the two limiting rays of each collection of rays, for example the rays SHS and $SBR_n$ in FIGS. (2) and (5). The more precise integration limits for the displacement vectors are then given by the lengths HB to the left and to the right.

The set of techniques presented above is applied to all the pairs of sections containing the migrated stack section and at least one migrated shotpoint, knowing that, when there is a plurality of migrated shotpoints on a given section, they should not interfere with one another so as not to perturb the measurements. Staggering the various shotpoints on various migration planes makes it possible to migrate all the shotpoints, if desired, without interference.

Figure 11:
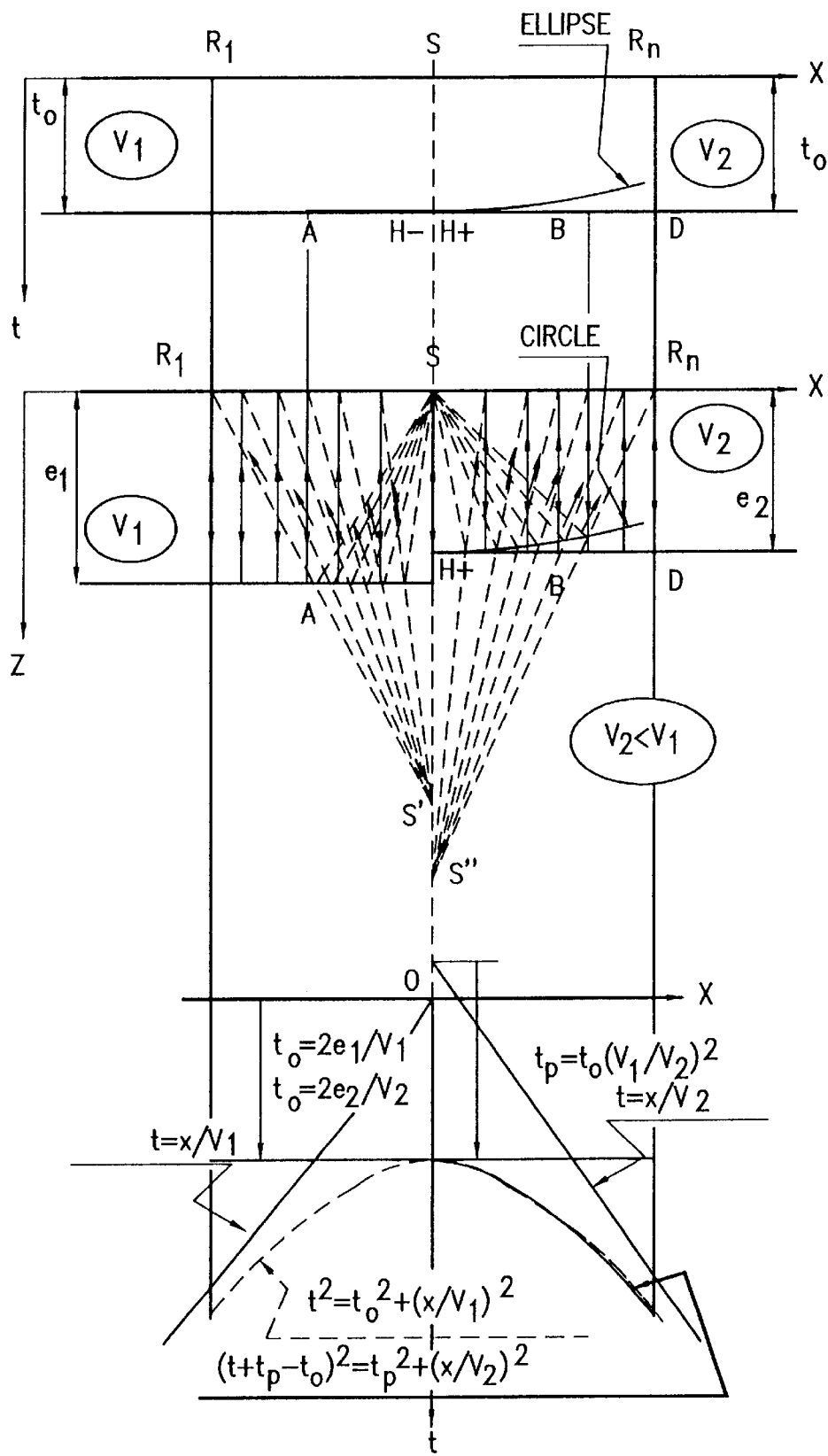
FIGS. 11 and 12 are schematic representations of time-migrated images.
Figure 12:
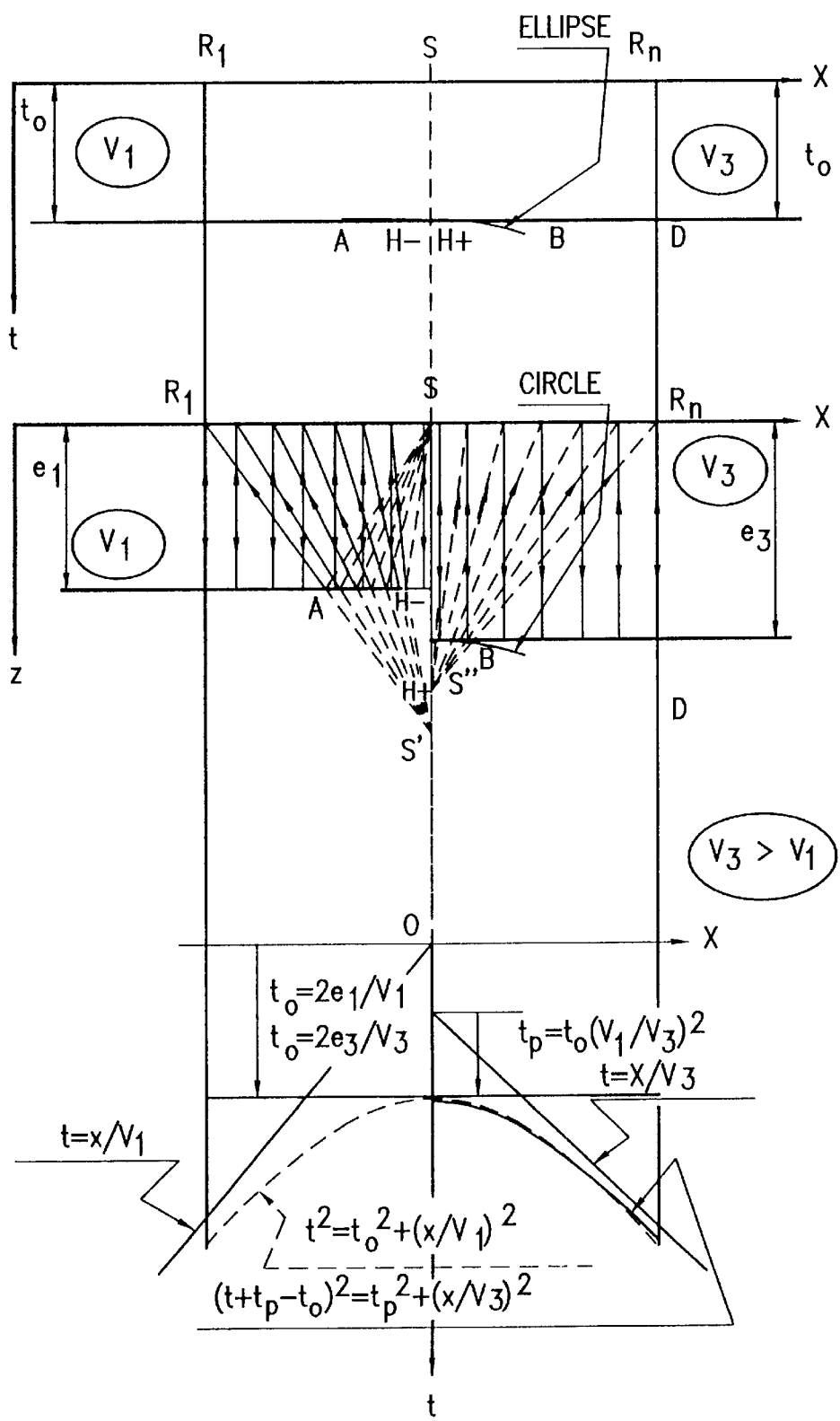

FIGS. 11 and 12 relate to a differential time migration which can be applied not to depth-migrated sections but to a poststack time-migrated section and a likewise time-migrated shotpoint section in the same velocity field.

FIG. (11) represents the case in FIG. (2), that is to say the case of depth-migration of the horizontal plane stratum in a migration velocity $V_2$ which is less than the true stratum velocity $V_1$, compared with the case of migration in the correct velocity field $V_1$. The two superposed time migrations carried out in the same migration velocity fields as the above depth objects are represented above this image. The time-migrated image is obtained by dividing the vertical distance of the points of the central image by the local migration velocity used. To the left and to the right of S, this operation gives the same time $t_o$ for the poststack migrated image. The shotpoint migrated in the correct velocity to the left of S also gives a mirror portion coinciding with the poststack image of this mirror. Conversely, when migrated in the wrong velocity to the right of S, the shotpoint gives an ellipse in the time migration instead of a circle in the depth migration. This ellipse is tangent at $H^+$ to the poststack time-migrated image. There is indeed therefore a meniscus in time migration as in depth migration.

FIGS. (11) and (12) show that the time-migration behaviour of this meniscus with respect to the discrepancy of the migration velocities with respect to the true velocity is the same as that of the depth migration. It changes sign at the same time as that of the velocity discrepancy.

Of course, the constant-offset trace set according to the invention may consist of stack traces (zero offset) or single traces with a predetermined offset which corresponds to the offset separating the shotpoint S from the first receiver $R_1$, but it is possible to take an arbitrary offset and, in particular, the maximum offset separating the shotpoint S from the last receiver $R_n$.

The migration of the two sets of traces or rays to which the present invention relates is performed with the same algorithm, for example that of KIRSCHOFF.

I claim:

1. A method for determining a migration velocity field in a medium comprising the steps of:
    providing a first set of traces which originate from the shotpoint and are recorded on the receivers separated from each other by offsets, said traces corresponding to a part of the medium;
    providing a second set of traces which is colinear with the first set, and which is comprised of traces with constant offset;
    migrating said first and second sets of traces in a given velocity field to obtain two migrated images of the part of the medium; and
    correlating the two migrated images by means of a two-dimensional spatial correlation whose result determines a difference between a given migration velocity field and the migration velocity field of the medium.

2. A method according to claim 1, wherein the migration is a time migration.

3. A method according to claim 1, wherein the migration is a depth migration.

4. A method according to claim 1, wherein the correlation is performed using a surface coherence treatment.

5. A method according to claim 1, wherein the correlation is performed using a line coherence treatment.

6. A method according to claim 5, wherein the line coherence treatment is preceded by a surface coherence treatment.

7. A method according to claim 4, wherein the surface coherence treatment comprises the steps of:
    determining, for a first of the two migrated images, at least a first window whose dimensions are such that it comprises at least one of the seismic events identified on the first image;
    defining, in the first window, a single amplitude ($A_{ij}$) which represents the mean of the amplitudes of the pixels in the first image which are included in the first window;
    locating the first window by the coordinates (x, z) of its center;
    moving the first window over the entire surface of the depth-migrated section;
    performing the aforementioned determining, defining, locating and moving steps for the second of the two migrated images, with at least a second window in which a single amplitude ($B_{ij}$) is defined which represents the mean of the amplitudes of the pixels of the second image which are included in the second window, and
    defining a correlation coefficient ($\Gamma$) by coupling at least two windows, one of which is associated with one of the two migrated images and the other of which is associated with the second of the migrated images, the coupled windows having the same spatial position.

8. A method according to claim 7, further comprising the steps of:
    calculating and representing lines of equal value of the correlation coefficient ($\Gamma$), the lines being referred to as isovalue lines;
    determining a maximum value ($\Gamma_M$) of the correlation coefficient ($\Gamma$);
    plotting the coordinates (x', z') of the point of maximum correlation ($\Gamma_M$); and
    calculating the half isovalue ($\Gamma_M/2$) defined as half the maximum value ($\Gamma_M$) of the correlation coefficient.

9. A method according to claim 8, further comprising the step of measuring displacement vectors representing offsets between the two migrated images, the displacement vectors being measured over the entire surface which is common to the two migrated images and lies within each half isovalue ($\Gamma_M/2$).

10. A method according to claim 8, wherein lateral gradients of the migration velocity field used are calculated as well as a sign of an error on the migration velocity close to the point of maximum correlation ($\Gamma_M$), then the displacement vectors lying between the point of maximum correlation and the correlation curve representing the half isovalue ($\Gamma_M/2$) are stacked separately to the left and to the right of the point so as to obtain a stack vector on each side of the point of maximum correlation, the direction or sign of which determines a slow or fast nature of a local migration velocity with respect to an optimum velocity, then comparing the signs of the stack vectors to determine an existence or absence of a lateral component of the migration velocity.

11. A method according to claim 8, further comprising the steps of:
- producing two depth-migrated images, one being representative of depth-migrated seismic events and the other being representative of the depth-migrated shotpoint;
- picking an isolated event on each of the two migrated images; and
- calculating the distance between the two picked events so as to calculate the length of the local displacement vector.

12. A method according to claim 11, further comprising the step of using a ray-tracing technique to calculate two limiting rays corresponding to a zero-offset (SHS) ray and a maximum-offset ($SBR_n$) ray.

13. A method according to claim 1, wherein use is made of a plurality of shotpoints which are migrated with staggering in different migration planes.

14. A method according to claim 1, wherein the two sets of traces are migrated by means of the same algorithm.

\* \* \* \* \*